Aug. 2, 1960     F. E. ULLERY     2,947,395
ONE-WAY CLUTCH
Original Filed April 18, 1952
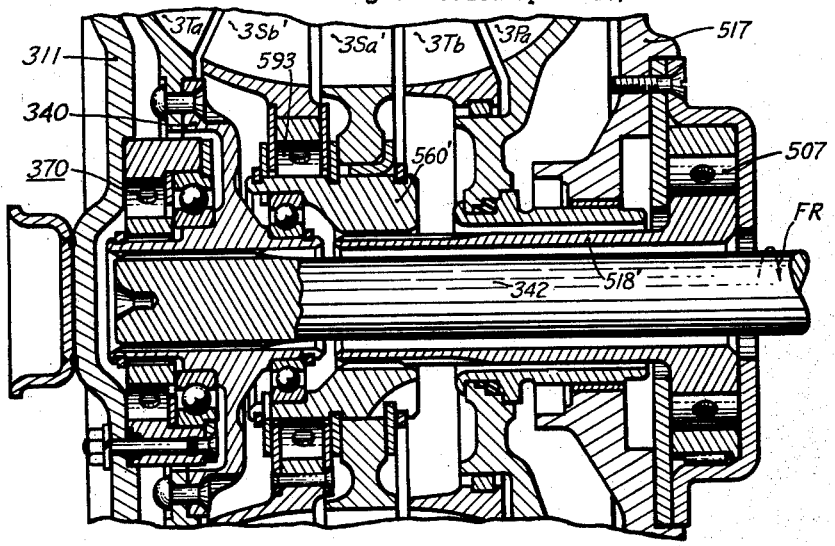
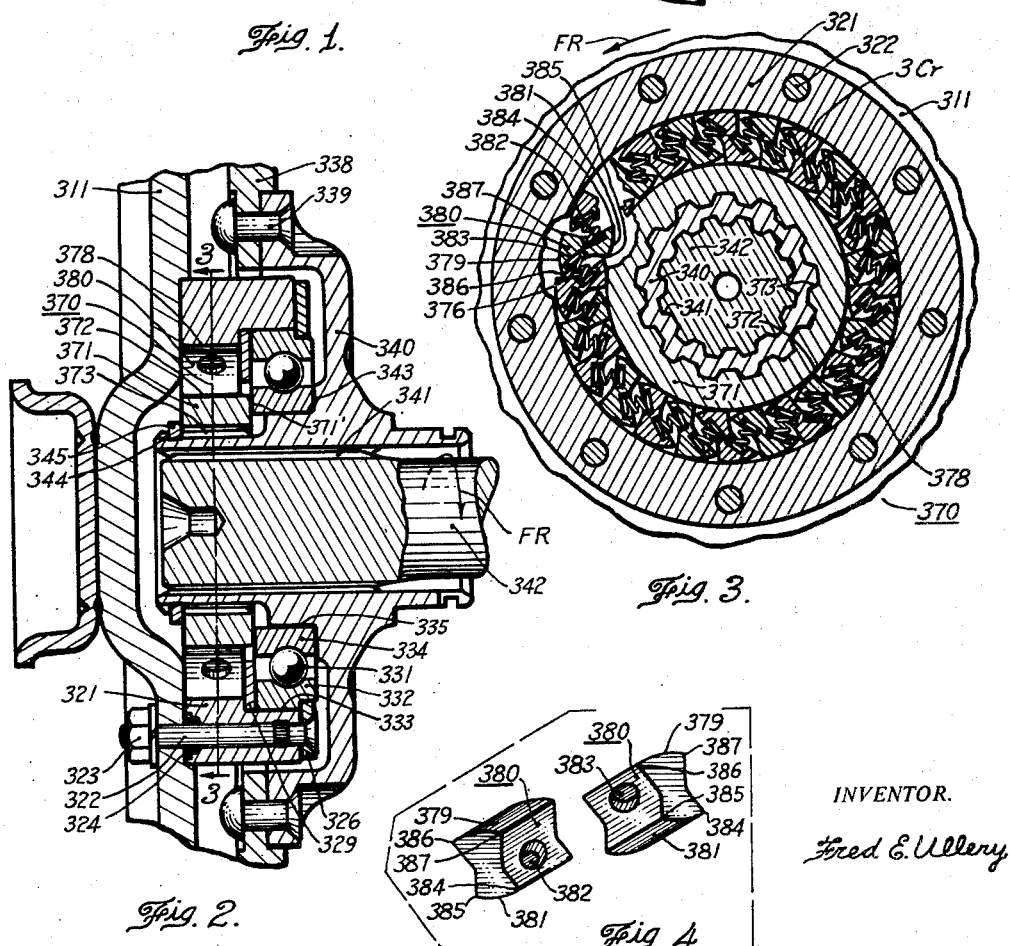
INVENTOR.
Fred E. Ullery

United States Patent Office 2,947,395
Patented Aug. 2, 1960

2,947,395

ONE-WAY CLUTCH

Fred E. Ullery, 8231 Marygrove Drive, Detroit, Mich.

Original application Apr. 18, 1952, Ser. No. 283,090, now Patent No. 2,762,198, dated Sept. 11, 1956. Divided and this application June 22, 1956, Ser. No. 593,131

2 Claims. (Cl. 192—45.2)

This is a divisional application, the parent application being Serial No. 283,090, filed April 18, 1952, and titled "Member Spacing Construction in Hydrodynamic Torque Converters"; and from which Patent No. 2,762,198 issued September 11, 1956.

This divisional application is filed consonant with a requirement to restrict the claims of the designated parent application; and relates to subject matter which was fully disclosed in the parent application, being thus qualified for the benefit of the filing date thereof.

The invention set forth in this application relates to a one-way clutch for rendering two coaxial components of a machine one-way rotatory, one to the other. As disclosed herein for three different pairs of components in a hydrodynamic torque converter, the basic construction of this one-way clutch has important fundamental advantages, one unusual advantage being expedient adaptability for specific physical circumstances and functional needs.

The construction basically includes: a drum having a smooth cylindrical outer surface; a support ring having a smooth cylindrical inner surface disposed around the drum outer surface to bound an annular space therebetween; a plurality of sprags arranged around the annular space to effect one-way jamming operative to render the drum and the support ring one-way rotatory, one to the other; and, a plurality of compression type springs of coil form, each spring being disposed with its coil axis oblique from the circumferential trend of the annular space and interposed between two adjacent sprags to urge the outer end of one and the inner end of the other in opposite circumferential directions to induce prompt jamming action.

The jam-urging arrangement, which is believed to be novel, is essential for and leads to effective attainment of some of the objectively sought advantages.

One important object of the invention is to achieve high capacity for transmitting torque through the one-way clutch in the jammed and clutched direction to thus minimize the space required for its accommodation and to accordingly improve its utility. The agreeable physical correlation of the jamming sprags and the jam-urging means furthers circumferential compactness so that a large number of the sprags may be accommodated around the stated annular space. The torque transmitting capacity for given proportions being approximately proportional to the number of jamming elements, high capacity is accordingly obtained.

Another important object is to further efficiency of the device and durability of its features for the free-whirling operation during which relative rotation exists between the opposing elements, that is, between the drum and the support ring. This operation involves sliding action between frictional-gripping surfaces; and effective attainment of this objective requires minimization of the differential velocity and the frictional drag of that sliding action, and also, avoidance of scuffing damage by abrupt and cyclic transitions of the sprags as a group from rotational unisonance with the drum to that with the support ring, and vice versa. The characteristics of the present jam-urging means are unusually favorable for and contribute to these attainments.

In commonly known sprag-type one-way clutches, in which the jam-urging means is a spiral-wound spring of garter form having a tensile band influence on the sprags, the radial component of the jam-urging means is inward and opposite to the centrifugal forces which vary with the rotational speed of the sprags as a group; so, the sprags rotate with the drum or with the support ring, with frequent abrupt transitions from one to the other, according to the respective predominance of these inward and outward radial forces.

Contrariwise, the present jam-urging means exerts a compressive circumferential force, the resultant radial influence on the sprags being outward like the centrifugal forces and acting therewith to cause rotation of the sprags with the support ring; thereby avoiding the aforestated transitions, and tending to restrict the stated sliding action to the relatively low differential velocity between the inner ends of the sprags and the cylindrical surface of the drum.

Also, regarding centrifugal influence on the intensity of the jam-urging action, the present jam-urging means permits the sprag cross-sectional form to be that which is respectively expedient for the specific operation of the particular one-way clutch. For the embodiment which is most fully disclosed herein, both the drum and the support ring rotate, and one-way clutching must be available over a wide speed range; accordingly, the jam-urging action should be free from centrifugal influences, in furtherance of which, the sprag cross-sectional form is such that the sprag center of gravity is maintained approximately in radial alignment with the sprag outer end contact with the support ring. However, for another illustrated embodiment, the support ring free-whirls forwardly relative to the drum, and clutching occurs only when the drum is stationary and the support ring tends to rotate backwardly; hence, centrifugal counteraction of the jam-urging action is advantageous, in furtherance of which, the sprag cross-sectional form may be that having the sprag center of gravity appropriately offset from radial alignment with the sprag outer end contact with the support ring.

Another object is to improve reliability and responsiveness of the jam-urging action. This involves minimization of inertia, frictional and viscous retarding factors, the last-named being especially important for cold weather operation of a one-way clutch submerged in oil. Effective accomplishment of this objective is evidenced: by the almost negligible weight of the springs which serve as the jam-urging means; by the fact that the springs act directly on the sprags without sliding action; and by the freedom of the physical form of the jam-urging means from significant entrapment of fluid and viscous drag.

Still another object is to further ease and economy of manufacture. Only a small number of types of parts are required inasmuch as the present invention does not require supplementary structure either for circumferential spacing of the sprags or for locating and retaining the jam-urging means. Each of the parts, the drum, the support ring, the sprags, and the springs, of the basic construction has a simple physical form and lends itself to economical manufacture by known production methods.

These objects and advantages, and others, will be apparent to persons skilled in the art from the ensuing description in connection with the accompanying drawings, in which:

Fig. 1 is a longitudinal fragmentary section of a hydrodynamic torque converter showing the central portion thereof, as cut by a radial plane containing the axis of rotation, and illustrating advantageous usage of one-way clutches 370, 507 and 593, each of which is an embodiment of the present invention;

Fig. 2 is an enlarged section of one-way clutch 370, inclusive of elements or fragments of elements which are structurally associated with that clutch for the particular usage, the plane of this section being the same as that of Fig. 1;

Fig. 3 is a section of one-way clutch 370, inclusive of elements structurally associated therewith, taken on, and axially viewed as directionally indicated at, line 3—3 of Fig. 2, but having one spring and fragments of the drum, the support ring and two sprags deleted so as to distinctly show the termini of lines leading from reference characters to specific features; and, Fig. 4 is a view of two adjacent sprags 380 which are somewhat enlarged and are obliquely exploded apart so as to show the neighboring sides and the opposing spring-seats thereof.

In describing the operation of each of the illustrated embodiments, respective forward and backward rotational tendencies and characteristics are pointed out for the torque converter components with which the drum and the support ring of the particular one-way clutch are rotationally united, respectively; the direction of forward rotation being as indicated by a directional arrow FR in each of Figs. 1, 2 and 3.

Fig. 1 shows, for a hydrodynamic torque converter, a central construction including: a central portion of each of five bladed members, namely, turbine 3T*a*, stator 3S*b*′, stator 3S*a*′, turbine 3T*b*, and pump 3P*a*; a fragmentary portion of a casing end cover 311, which is usually adapted for rotational association with a power source so as to transmit power therefrom to the torque converter; a turbine hub 340 which, serving as an intermediary component of a driven structural train, has turbine 3T*a* firmly attached thereto and is rotationally united with the torque converter output power shaft 342; and, a hollow reaction shaft 518′ which has a stator hub 560′ rotationally united with its front (innermost) end, and has its back end formed integral with the drum element of one-way clutch 507 which is shown in a functionally suitable relationship with a fragmentary portion of a stationary support structure 517. Also, as shown, stator 3S*a*′ is rotationally united with the stator hub 560′ which also includes a portion which is the drum element of one-way clutch 593 through which stator 3S*b*′ is associated with that stator hub.

Regarding functional rotational influences effected between components of the torque converter by the exemplified embodiments of the present invention: one-way clutch 370 permits forward rotation but prevents backward rotation of end cover 311 relative to the rotationally united turbine hub 340 and output power shaft 342; one-way clutch 507 permits forward rotation and prevents backward rotation of the rotationally united stator 3S*a*′, stator hub 560′ and reaction shaft 518′ relative to the stationary support structure 517; and, one-way clutch 593 permits forward rotation and prevents backward rotation of stator 3S*b*′ relative to the stator hub 560′.

For normal transmission of power, the rotational tendencies of stators 3S*b*′ and 3S*a*′ are naturally such that stator 3S*a*′ never tends to rotate forwardly unless stator 3S*b*′ is so rotating; and when both are rotating forwardly, the speed of stator 3S*b*′ is faster than that of stator 3S*a*′. So, the disclosed construction is suitably operative for rendering each of stators 3S*b*′ and 3S*a*′ firm against backward rotation and rotative forwardly; thus being operative for each of these stators to render a respective array of blades backwardly firm for their utilitarian purposes, but forwardly yielding to avoid directional influences which would be detrimental.

Regarding one-way clutch 370, some of the functional advantages and physical requirements of the particular adaptation may be comprehended from its usage in the drive train of an automobile, for which, it renders the coast-drive mechanically positive through the torque converter; thereby, affording more engine-braking effort for downhill operation, reducing the speed required for push-starting of the engine, and avoiding engine stumbling and dying while the automobile has any forward motion whatsoever.

In the enlarged sectional view of Fig. 2, for which the plane of the section is the same as for Fig. 1, the elements of one-way clutch 370 and those of a bearing are more distinctly shown structurally arranged and correlated together and with components of the torque converter in a compact combination construction which, not only permits forward rotation and prevents backward rotation of the end cover 311 relative to turbine hub 340, but radially centers and axially locates turbine hub 340 with respect to end cover 311. The illustrated bearing is a ball-type which includes an outer race 332, an inner race 334, and an intermediary circular-row of balls 331; but, it is contemplated that other types of bearings may be used with appropriate physical adaptations.

The support ring 321 of one-way clutch 370 and the outer race 332 of the stated bearing are associated with end cover 311, the association of the bearing outer race being through the support ring, as forthwith described. The support ring 321 is centered with, and is abutted against an inside (back side) surface of, the end cover 311. The outer race 332 is centered and axially fixed with the support ring 321, being situated in the circular mounting 333 thereof, and being interposed and axially confined between the front side surface of the race retainer disc 326 and the back side surface of the sprag guide disc 329 which is shouldered in the support ring. A plurality of circumferentially spaced screws 322 axially fix and rotationally unite the race retainer disc 326 with the support ring 321, and that support ring with the end cover 311, each screw passing through those elements, and having an encircling seal 324 and an external fastening nut 323.

The drum 371 of one-way clutch 370 and the inner race 334 of the stated bearing are associated with the turbine hub 340. Specifically described, the inner race 334 is centered on a circular mounting 335 of the turbine hub 340, and is axially fixed therewith, being interposed and axially confined between the turbine hub front side surface 343 and the annular back side surface 371′ of the drum 371 which is rotationally united and axially retained with the turbine hub, respectively, by mating splines 373, and by the snap ring 345 which is situated in the turbine hub ring groove 344 and abuts the front side of the drum 371.

For the ensuing description of elements and physical features which effect the jam-urging action and the one-way jamming and clutching operation of one-way clutch 370, attention is directed to Fig. 3 which is a sectional view taken on line 3—3 of Fig. 2, and to Fig. 4 which is a view of two adjacent sprags 380 somewhat enlarged and obliquely exploded apart.

The support ring 321 has a smooth cylindrical inner surface 378 which is concentrically disposed around, and radially spaced apart from, a smooth cylindrical outer surface 372 of the drum 371. These surfaces bound an annular space occupied by a plurality of one-way jamming sprags 380, spaced somewhat adjacently around that annular space.

Each of the sprags has: at its outer end, a smooth gripping surface 379 in axial line contact with the support ring inner surface 378; and, at its inner end, a smooth gripping surface 381 in axial line contact with the drum outer surface 372. The distance between the inner and the outer axial lines of contact of each sprag is slightly greater than the radial distance between the drum outer surface 372 and the support ring inner surface 378; so that, the lines of contact of each sprag lie in a respective plane which is slightly oblique from the particular radial plane that contains the respective inner line of contact, each sprag being oblique in the same angular direction. The permissible angle of obliquity depends somewhat on the influence of the jam-urging means; otherwise, for the sprag smooth surface jamming and frictional-gripping, the tangent of the angle of obliquity at an axial line of contact must not exceed the coefficient of friction existing at the particular contact.

In the preceding paragraph, the contacts of the sprag gripping surfaces with the drum and the support ring surfaces were referred to as axial lines of contact in order to clearly describe the relative disposition of the sprags. Actually, these contacts exist as lines only for light contact pressures. The pressures are very high at these contacts when much torque is transmitted in the jammed direction, and the surfaces are consequently compressed into axial bands of surface contact, of which, the lines of effective pressure represent the nominal lines of contact.

For the free-whirling operation, the pressure at the outer line of contact of a sprag exceeds that at its inner line of contact due to the circumferential expanding tendency of the circular array of sprags, that expanding tendency being exerted by the compression type springs 376 of the jam-urging means, the features of which are presently described. Also, for an embodiment such as one-way clutch 370, in which the array of sprags rotate, centrifugal effects further add to the pressure existing at the outer line of contact of each sprag. So, except for occasional and progressive creep, the circular array of sprags rotationally remains with the support ring.

Hence, for an abutting relationship of adjacent sprags for assuring proper circumferential spacing, it is preferable that such a relationship should be near the outer ends of the sprags 380; whereat, as shown in Fig. 3, a toe 386 of each sprag abuts, or nearly abuts, a heel 387 of an adjacent sprag. Also, near the inner ends of the sprags 380, there may be a similar abutting relationship of the toe 384 and the heel 385 of adjacent sprags, but usually with somewhat more clearance.

Regarding the jam-urging means, it is preferable that a separate spring 376 be included between each two adjacent sprags, as shown in Fig. 3. Therein, a jam-urging spring 376 of compression type and of coil form is compressed and interposed between each pair of opposing sides of adjacent sprags 380, as follows: one end coil is situated in a spring seat 383 in the side of, and near the outer end of, one of the two adjacent sprags; and the opposite end coil is situated in an opposing spring seat 382 in the opposing side of, and near the inner end of, the other one of the two adjacent sprags. Thus, each spring 376 is disposed with its coil axis considerably oblique from tangency with an imaginary circle (of which an arc 3Cr is illustrated) which is concentric with the drum outer surface 372, and intersects the spring coil axis midway between the coil ends. As shown, the springs 376 urge the inner and the outer ends of the sprags 380 in the opposite circumferential directions conducive to jamming.

For an embodiment having a separate spring between each two adjacent sprags, such as shown in Fig. 3, the respective jam-urging action on each sprag may be separately comprehended, as follows: each sprag 380 has an opposing pair of spring seats 382 and 383 which are offset from each other so that the respective thrusts of the springs 376, at the opposite sides of each sprag, induce a moment acting on and urging each sprag towards radial disposition into the jamming situation with the drum 371 and the support ring 321.

In the foregoing description, it is stated that it is considered preferable that a jam-urging spring be included between each two adjacent sprags; however, it is realized that some of the jam-urging springs 376 shown in Fig. 3 may be omitted if, for the sprags between which the springs are omitted, the abutting relationships of the toes 384 and 386 respectively with the heels 385 and 387 are made sufficiently accurate to effect simultaneous jamming and releasing of the particular sprags.

Also, it is realized that with appropriate modifications, an embodiment of this one-way clutch between two components of a machine may serve as the radial bearing means for supporting one component relative to the other. With suitable clearance limitations of the sprag toe to heel relationships to properly restrict the released disposition of the sprags 380, and thus to limit the radial clearance between the sprag surfaces 381 and the drum surface 372, the multiplicity of these sprag surfaces simulate, for sliding action relative to the drum surface, a ramp type of radial bearing which is adequate to radially support a light weight component, such as, either the stator 3Sb' or the back end of the reaction shaft 518' of Fig. 1.

In some embodiments requiring considerable radial bearing capacity, several groups of sprags may be replaced by slipper type bearing blocks. For example, in a one-way clutch in which eighteen sprags suffice to fulfill the torque transmitting needs, and in which there is circumferential space to accommodate about thirty sprags, eighteen sprags in three groups of six sprags and three intervening bearing blocks may be used. Each of the three bearing blocks should have an outer arcuate surface which is contiguous and conforms with the support ring surface 378, and an inner arcuate surface in radial bearing association with the drum surface 372. The opposite ends of each bearing block should have features comparable to those of a sprag as regards the spring seats 382 and 383, the toe 386 and the heel 387; but the toe 384 and the heel 385, which are near the drum surface, should be somewhat abbreviated to avoid interference with the adjacent sprags as regards the slight rocking motion essential to proper jamming and releasing actions.

In the forepart of this specification, some of the objects and advantages of this one-way clutch invention are set forth with brief explanations. Effective realizations of these objectively sought advantages are manifested in the ensuing comments, wherein contributory and essential factors and influences are pointed out with adequate explanations; the factors and influences being physical features and characteristics disclosed in the illustrations and the foregoing descriptions and explanations. Also, the ensuing comments point out fulfillments of special needs for various operating conditions which are exemplified by the three embodiments illustrated in Fig. 1.

That this one-way clutch has usually large capacity for transmitting torque in the jammed and clutched direction is quite evident from a consideration of fundamental principles applied to the disclosed features. At each frictional-gripping contact of a jamming element, the peripheral force component is small relative to the radial force component which tends to crush the surfaces; the transmittable magnitude of the peripheral force being accordingly limited. Thus, for given physical proportions and material properties, the torque transmitting capacity of a one-way jamming and frictional-gripping clutch is approximately proportional to the number of jamming elements.

As shown in Fig. 3, the novel arrangement of the jam-urging springs 376 with the sprags 380 is quite compact, and an unusually large number of sprags is accordingly accommodated. Thus, for a specific torque transmitting requirement, the physical size of the one-way clutch may be unusually small. This is an important advantage for an application where the torque transmitting requirement is large and space is in demand, such as, the applications of one-way clutches 370 and 507 shown in Fig. 1.

Regarding efficiency of this one-way clutch invention and the durability of its features for the free-whirling operation, which involves sliding action of frictional-gripping surfaces, the invention has physical features and characteristics which are especially appropriate and advantageous for the free-whirling operation.

Along with the aforesaid objects and advantages, it is pointed out that in some of the well-known sprag-type one-way clutches, there are conflicting influences affecting the rotation of the sprags and the sliding action: the nature of the jam-urging means tends to cause the sprags to rotate with the drum, whereas, the centrifugal effects of rotation tends to cause the sprags to rotate with the support ring; consequently, there may be abrupt and cyclic transitions of the sprag rotational status from one to the other.

For the present invention, as pointed out and explained in the description of the features disclosed in Fig. 3, the predominant radial force exerted on the sprags by the jam-urging means is directionally outward, the same as the centrifugal effects; consequently, the array of sprags always tends to rotationally remain with the support ring. Thus, detrimental transitions are prevented, and the sliding action tends to be restricted to the relatively low differential velocity between the sprag inner end surfaces 381 and the drum surface 372.

Another advantage, which furthers efficiency and durability for the free-whirling operation, is that the physical form of the jam-urging means permits the sprag cross-sectional form to be that which, for the particular operating conditions, is most expedient as regards the intensity of the jam-urging action. Appropriate utilization of this advantage is explained forthwith for each of two of the disclosed embodiments, namely, one-way clutches 370 and 593 of Fig. 1.

In one-way clutch 370, which prevents forward speed lag of the end cover 311 relative to the turbine hub 340, one-way jamming and clutching is required over a wide speed range; for instance, in a vehicle drive application, the sprags must jam and grip whenever the vehicle coasts irrespective of the actual speed of the vehicle. Of course, undue intensity of the jam-urging action in any portion of the speed range would cause undesirable frictional drag for the free-whirling operation. To provide proper jam-urging action over the speed range without excessive intensity of the action in any portion, the jam-urging action should be nearly free from centrifugal influences; in furtherance of which, the sprag cross-sectional form should be such that each of sprags 380 has its center of gravity approximately in radial alignment with the axial line of contact of its outer surface 379 at the support ring surface 378. For the slight variation in sprag obliquity from the jammed to the released disposition, this radial alignment tends to be maintained by the rolling action at the surface contact and the attendant circumferential shift thereat of the axial line of contact.

In one-way clutch 593, which permits forward rotation but prevents backward rotation of stator 3S$b'$ relative to stator hub 560', the conditions are such that stator hub 560' is always stationary when stator 3S$b'$ tends to rotate backwardly. Hence, when jamming is needed, there are no centrifugal influences. For the free-whirling operation in this application, centrifugal moderation of the intensity of the jam-urging action is desirable. To effect this moderation, the sprag cross-sectional form should be such that each of the sprags has its center of gravity offset from radial alignment with its outer end contact at the support ring, so that, the centrifugal outward force induces a moment which is counteractive of the jam-urging action. Thus, for the free-whirling operation frictional drag of the sliding action is reduced.

Regarding reliability and responsiveness of the jam-urging means, the physical features and characteristics shown in Fig. 3 manifest excellency in these respects. Specifically, it is evident that the jam-urging action is uniformly exerted on the sprags and is remarkably free from retarding influences: inertia lag is insignificant, the only elements of the jam-urging means being the very light weight springs 376; absence of frictional drag or hysteresis is shown by the fact that the springs 376 act directly on the sprags 380 without sliding action; and viscous impediment is minimized as indicated by the unusual freedom of the jam-urging means from fluid entrapment and viscous drag influences.

Regarding ease and economy of manufacture, an important advantage of this one-way clutch invention is that a supplementary structure is not required either for circumferential spacing of the sprags or for locating and retaining the jam-urging means. Thus, only a small number of types of parts are required; and, as regards essential features, each of these parts may be economically manufactured by known production methods. Specifically, the formations of the cylindrical surfaces, namely, the outer surface of the drum and the inner surface of the support ring, are common inexpensive operations; the jam-urging springs may be produced from coiled wire stock on an automatic spring forming machine; and the sprags may be processed as sections cut off of stock rolled and profiled in strip form, which is a process used for producing sprags of well-known one-way clutches.

Although a preferred embodiment of this one-way clutch invention has been described in detail, it is, of course, understood that the invention is not limited to the particular forms and structures shown in the drawings, or otherwise revealed, for disclosure and explanatory purposes, but also embraces modifications within the scope of the appended claims.

I claim:

1. A one-way clutch adaptable for rendering two coaxial components of a machine one-way rotatory, one to the other, and comprising: a drum having a smooth cylindrical outer surface; a support ring having a smooth cylindrical inner surface disposed around said drum outer surface to bound an annular space therebetween; a plurality of one-way jamming sprags arranged around said annular space, each of said sprags being disposed with an axial line contact with said drum outer surface and an axial line contact with said support ring inner surface and with the plane of said contacts oblique from radial disposition to effect one-way jamming operative to render said drum and said support ring one-way rotatory one to the other, and each of said sprags having a pair of spring seats which, one to the other, are situated on circumferentially-opposite sprag sides and are radially offset; and jam-urging means for said sprags including a plurality of compression type springs of coil form having end coils situated in said spring seats and disposed so that a spring thrust is transmitted to each seat of each said pair of spring seats, each of said springs being disposed with its coil axis oblique from tangency with an imaginary circle which intersects its coil axis midway between its opposite end coils and is concentric with said drum outer surface, and each of said spring seats being disposed for normal squareness with the coil axis of the particular spring which is situated thereat, said urging means thus being operative to induce said one-way jamming action simultaneously for each of said sprags.

2. The combination defined in claim 1 in which each sprag of said plurality of sprags has respective toe and heel features which are arranged in toe to heel relationship between circumferentially successive sprags to therefore form circumferential-spacing and action-synchronizing means.

References Cited in the file of this patent

UNITED STATES PATENTS 2,268,376    Dodge               Dec. 30, 1941

FOREIGN PATENTS 1,047,637    France              July 22, 1953